United States Patent [19]

Nishibe et al.

[11] Patent Number: 5,142,433
[45] Date of Patent: Aug. 25, 1992

[54] MOTOR DRIVE CIRCUIT

[75] Inventors: Yasushi Nishibe; Hitoshi Iwata, both of Aichi, Japan

[73] Assignee: Kabushiki Kaisha Tokai Rika Denki Seisakusho, Aichi, Japan

[21] Appl. No.: 567,735

[22] Filed: Aug. 15, 1990

[30] Foreign Application Priority Data

Aug. 23, 1989 [JP] Japan ................. 1-98162[U]

[51] Int. Cl.⁵ ............................. H02H 3/20
[52] U.S. Cl. ................. 361/117; 361/111; 361/118
[58] Field of Search ............ 361/117, 118, 23; 307/104; 318/341, 293, 444

[56] References Cited

U.S. PATENT DOCUMENTS

| | | | |
|---|---|---|---|
| 3,668,414 | 6/1972 | Norian et al. | 307/104 |
| 4,705,997 | 11/1987 | Juzswik | 318/341 |
| 4,710,686 | 12/1987 | Guzik | 318/293 |

Primary Examiner—A. D. Pellinen
Assistant Examiner—S. Jackson
Attorney, Agent, or Firm—Finnegan, Henderson, Farabow, Garrett and Dunner

[57] ABSTRACT

A motor drive circuit comprises a motor, a DC source connected to said motor, first and second switching elements turned on and off to control a current flowing to the motor having one terminal connected to a common connecting point of the first and second switching elements, and when the current flowing to the motor is stopped by the first switching element, the second switching elements is turned on to break the motor, a reverse current bypassing circuit connected to at least one of said first switching element and said second switching element for bypassing a reverse current supplied by the DC source, a reverse current blocking circuit connected to said second switching element for blocking the reverse current and a surge absorbing circuit connected to at least one of the first switching element, the second switching element and a series circuit of the second switching element and the reverse current blocking circuit for absorbing a surge generated when the first switching element is turned off in response to a locking to the motor.

13 Claims, 3 Drawing Sheets

MOTOR DRIVE CIRCUIT

BACKGROUND OF THE INVENTION

This invention relates to a motor drive circuit which drives a motor load using a DC source, and which when required to stop the motor load, brakes the same.

A conventional motor drive circuit of this type is used, example, for in driving a vehicle wiper motor. Such a motor drive circuit is shown in FIG. 13. In FIG. 13, reference numeral 1 designates a vehicle battery, the positive and negative terminals of which are connected to a series circuit of a pnp transistor 2 and an npn transistor 3; and diodes 4 and 5, which are connected in parallel to the transistors 2 and 3, respectively. These diodes bypass current when voltage is applied to transistors 2 and 3 in the reverse direction. Further in FIG. 13, reference numeral 6 designates a wiper motor the two terminals of which are connected to the common connecting point of transistors 2 and 3 and the negative terminal of the battery 1; and 7, a control circuit for applying control signals to the bases of transistors 2 and 3 to the on-off switching control of the transistor.

The motor drive circuit thus constructed, and in particular control circuit 7 operates to render transistor 2 conductive (ON), such that current is supplied from vehicle battery 1 to wiper motor 6 to drive wiper motor 6. To stop the wiper motor, the control circuit 7 operates to render transistor 2 non-conductive (OFF) to stop the flow of current from the vehicle battery 1 to wiper motor and to render the other transistor 3 conductive (ON) to substantially short-circuit the two terminals of the wiper motor 6, thereby braking the wiper motor 6.

The above-described conventional motor drive circuit is disadvantageous in that if vehicle battery 1 is connected with the polarity reversed, then forward voltage is applied to diodes 4 and 5 connected in parallel with transistors 2 and 3, such that a large current flows through diodes 4 and 5 breaking them. This difficulty may be eliminated by removing diodes 4 and 5 from the circuit. However, this is still disadvantageous in that transistors 2 and 3 may be broken if a negative surge voltage inherent in such vehicle system is produced. Accordingly, transistors 2 and 3 must be rated to withstand high voltage, which increases the manufacturing cost of the motor drive circuit.

The above-described difficulties have been overcome in-part by a motor drive circuit design as shown in FIG. 14. In this motor drive circuit, a reverse current blocking diode 8 is connected between the positive terminal of the vehicle battery 1 and emitter of transistor 2 (with the diode 4 from FIG. 13 eliminated). With the motor drive circuit thus constructed diode 8 eliminates the above-described difficulties accompanying the case wherein battery 1 is connected reverse in polarity.

While it is true that the motor drive circuit of FIG. 14 can prevent this difficulty the circuit is nevertheless disadvantageous in that while wiper motor 6 is being energized by vehicle battery 1; i.e., during the operation of wiper motor 6, a load current flows through the reverse current blocking diode 8 at all times. Therefore, if the load current is large, diode 8 is greatly heated, thus increasing its temperature. Accordingly, the diode must be rated for large capacity, and it is necessary to provide a heat radiation board to help suppress the increase in temperature. Thus, unavoidably the motor drive circuit of FIG. 14 is relatively expense to manufacture and bulky.

The above-described difficulties may be overcome by the provision of a motor drive circuit as shown in FIG. 15. In this circuit, a reverse current blocking diode 9 is connected between vehicle battery 1 and transistor 3, to eliminate the difficulties which are caused if vehicle battery 1 is connected reverse in polarity. In the motor drive circuit of FIG. 15, the forward current flows through diode 9 only when braking wiper motor 6, and accordingly the period over which diode 9 is heated is greatly reduced. Thus, the motor drive circuit shown in FIG. 15 is less costly to manufacture and can be miniaturized.

However, the with motor drive circuit with having the reverse current blocking diode 9 as shown in FIG. 15 is not practical in use, because when the application of current to wiper motor 6 is suspended because it is locked, the inductance component of the wiper motor induces a great counter electromotive force, or surge voltage (for example −150 to −160 volts) across the two terminals of wiper motor 6. Since the motor drive circuit shown in FIG. 15 has no surge voltage discharging path, the surge voltage is, thus, applied across the emitter and collector of the transistor 2, thereby braking transistors 2 and 3.

In each of the motor drive circuits shown in FIGS. 16, 17 and 18, the terminals of wiper motor 6 are connected to the common connecting point of transistors 2 and 3 and the positive terminal of vehicle battery 1. That is, in the case where the operating functions of transistors 2 and 3 are exchanged one for other with the terminals of wiper motor 6 connected to the common connecting point of transistors 2 and 3 and the positive terminal of vehicle battery 1, the above-described difficulties still arise in the manners previously described.

SUMMARY OF THE INVENTION

In view of the foregoing, an object of the present invention is to provide a motor drive circuit which is so designed as to protect the circuit itself when its DC source is connected in reverse polarity, and to positively prevent its switching elements from being broken by the counter electromotive force produced when the motor load is locked, and which is low in manufacturing cost and can be miniaturized.

A motor drive circuit according to the invention has a fundamental arrangement in which first and second switching elements are connected in series to a DC source, and the first switching element is turned on and off to control the application of current to a motor load one terminal of which is connected to the common connecting point of the first and second switching elements, and when the application of current to the motor load is suspended to stop the latter, the second switching element is turned on to brake the motor load. In the fundamental arrangement, according to the invention, first and second reverse current bypassing diodes connected in parallel to the first and second switching elements, respectively; a reverse current blocking diode connected in series to the second switching element; and a surge absorbing circuit connected in parallel to the reverse current blocking diode.

The motor drive circuit thus organized may be modified as follows: In the fundamental arrangement, a reverse current bypassing diode is connected in parallel to the first switching element, a reverse current blocking diode is connected in series to the second switching element; and a surge absorbing circuit is connected in parallel to a series circuit of the second switching element and the reverse current blocking diode.

Alternatively, the motor drive circuit may be modified as follows: In the fundamental arrangement, a forward current bypassing diode is connected in parallel to the first switching element;a reverse current blocking diode is connected in series to the second switching element; and a surge absorbing circuit is connected in parallel with the first switching element.

In the first aspect of the present invention, when the DC source is connected reverse in polarity, the reverse current is blocked by the reverse current blocking diode, whereby the first and second diodes are prevented from overvoltage breakdown, and the surge voltage is absorbed by the surge absorbing circuit through the second diode which is induced when the switching element is turned off in response to the locking of the motor load, whereby the first switching element is prevented from overvoltage breakdown.

In the second aspect of the present invention, when the DC source is connected reverse in polarity, the reverse current is blocked by the reverse current blocking diode, whereby the diode is prevented from overvoltage breakdown, and the surge voltage is absorbed by the surge absorbing circuit which is induced when the switching element is turned off in response to the locking of the motor load, whereby the first switching element is prevented from overvoltage breakdown.

In the third aspect of the present invention, when the DC source is connected reverse in polarity, the reverse current is blocked by the reverse current blocking diode, whereby the diode is prevented from overvoltage breakdown, and the surge voltage is absorbed by the DC source through the surge absorbing circuit which is induced when the switching element is turned off in response to the locking of the motor load, whereby the first switching element is prevented from overvoltage breakdown.

BRIEF DESCRIPTION OF THE DRAWINGS

FIGS. 1 and 7 show an embodiment of this invention having a parallel combination of a diode and a capacitor as a surge absorbing circuit.

FIGS. 2 and 8 show an embodiment of this invention having a zener diode and series resistor connected parallel with a diode as a surge absorbing circuit.

FIGS. 3 and 9 show an embodiment of this invention having a capacitor connected in parallel with switching means 13 and a diode as a surge absorbing circuit.

FIGS. 4 and 10 who an embodiment of this invention having a series combination of a diode, resistor and zener diode connected in parallel with switching means 13 and diode 17 as a surge absorbing circuit.

FIGS. 5 and 11 show an embodiment o this invention having a capacitor connected in parallel with switching means 12 as a surge absorbing circuit.

FIGS. 6 and 12 show an embodiment of this invention having a series combination of a zener diode and a resistor connected in parallel with switching means 12 as a surge absorbing circuit.

DETAILED DESCRIPTION OF THE PREFERRED EMBODIMENTS

A first embodiment of the present invention, in which the technical concept of the invention is applied to a vehicle motor drive circuit, will now be described with reference to FIGS. 1 to 12.

Figure 1:
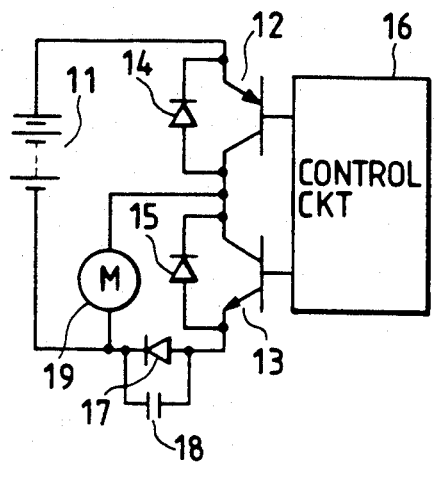
FIGS. 1 through 12 are circuit diagrams, partly as block diagrams, showing first through twelfth embodiments of this invention, respectively.

In FIG. 1, reference numeral 11 designates a DC source, or vehicle battery; 12 and 13, first and second switching elements, or a first transistor of pnp type and a second transistor of npn type, respectively. The emitter of first transistor 12 being connected to the positive terminal of vehicle battery 11, and the collector of the second transistor 13. Further in FIG. 1, reference numerals 14 and 15 designate first and second diodes, respectively. First diode 14 being connected between the collector and emitter of first transistor 12, and second diode 15 being connected between the collector and emitter of second transistor 13. These diodes are to bypass currents which are produced when counter electromotive forces are induced with transistors 12 and 13 turned off, thus protecting these transistors from overvoltage breakdown. Further in FIG. 1, reference numeral 16 designates a control circuit for supplying drive currents to the respective bases of transistors 12 and 13 to perform on-off control operations of the latter; 17, a reverse current blocking diode connected between the emitter of second transistor 13 and the negative terminal of vehicle battery 11, the reverse current blocking diode 17 being shunted by a surge absorbing circuit, or capacitor 18. The diode 17 is used to prevent the discharge which is caused when the vehicle battery is connected in reverse polarity, thereby protecting the motor drive circuit from damage. A motor load, or wiper motor 19, is connected between the collector of the second transistor 13 and the negative terminal of vehicle battery 11.

The motor drive circuit thus organized operates to drive wiper motor 19 in the following manner.

The control circuit 16 operates to render only first transistor 12 conductive so as to supply current to drive wiper motor 19. On the other hand, wiper motor 19 is stopped. When control circuit 16 operates to render first transistor 12 non-conductive to suspend the application of current to the motor, and to render second transistor 12 conductive. Even when the application of current to wiper motor 19 is suspended, the latter turns by its inertia. At the same time, an electromotive force is induced between the terminals of the wiper motor by electric power generation. Hence, when the two terminals of the wiper motor 16 are short-circuited by second transistor 13 which has been turned on, the generated current produces torque to turn wiper motor 19 in a direction opposite to the direction of inertial turn, thus braking the wiper motor.

In the case where, wiper motor 19 is locked for instance, because of a variation in the load, first transistor 12 is turned off to suspend application of current to wiper motor 19, the inductance component of the wiper motor momentarily induces a large surge voltage across the terminals of wiper motor 19. As a result, a large voltage, for example $-150$ to $-160$ volts, is applied to the collector of first transistor 12. However, in this case, the first transistor will not be broken by overvoltage, because second diode 15 and the capacitor 18 form a discharge path to absorb the surge voltage.

In the above-described motor drive circuit, the reverse current blocking diode 17 is connected in series with second transistor 13. Therefore, when vehicle battery 11 is connected in reverse polarity, diode 17 prevents discharge, thereby protecting the motor drive circuit from damage. In diode 17, forward current flows only when wiper motor 19 is braked; i.e., only when the second transistor 13 is conductive (ON), and accordingly the frequency of current application is small, and the resulting quantity of heat generated thereby is also small. Thus, the motor drive circuit may be manufactured at lower cost, and can be miniaturized. Furthermore, in the motor drive circuit, of FIG. 1 capacitor 18 is connected in parallel to the reverse stream blocking diode 17 as described above. Therefore, even in the case where wiper motor 19 is locked, first transistor 12 is turned off to suspend the application of current to the wiper motor, and the surge voltage induced in wiper motor 19 is absorbed, whereby damage to first transistor 12 can be prevented.

Figure 2:
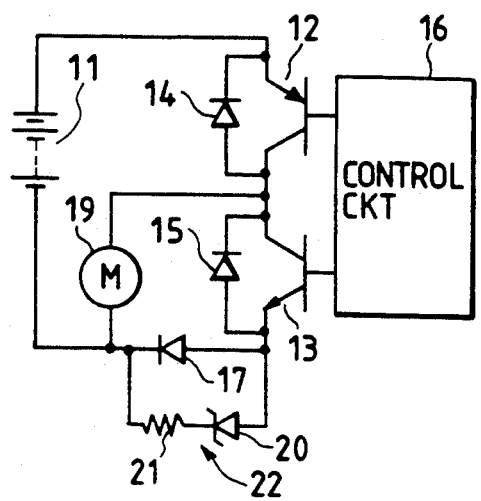

FIG. 2 shows a second embodiment of the present invention. The second embodiment is different from the first embodiment in that, instead of capacitor 17, a surge absorbing circuit is employed which is a series circuit of a Zener diode 20 and a resistor 21. The second embodiment thus organized has the same effect as the first embodiment.

Figure 3:
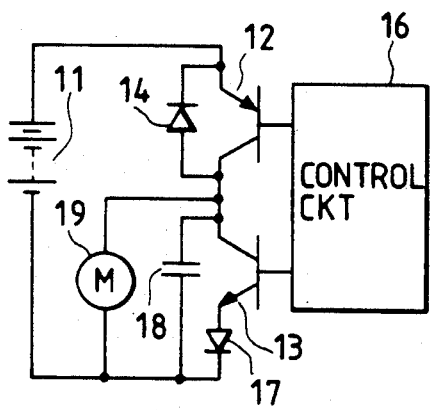

FIG. 3 shows a third embodiment of the present invention. The third embodiment is different from the first embodiment in that second diode 15 is eliminated, and capacitor 18 is connected to the terminals of wiper motor 19.

The third embodiment thus organized operates in the same manner as the first embodiment, when the wiper motor 19 is driven, or stopped by braking. Furthermore, the surge voltage produced when the wiper motor is locked and deenergized is discharged through the capacitor 18; that is, the surge voltage is absorbed by the capacitor 18. Thus, the third embodiment has the same effect as the first embodiment.

Figure 4:
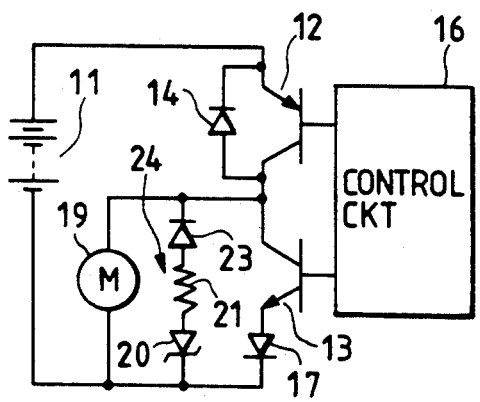

FIG. 4 shows a fourth embodiment of the present invention. The fourth embodiment is different from the third embodiment in that, instead of the capacitor 18, a surge absorbing circuit is employed which is a series circuit of a Zener diode 20, a resistor 21 and a diode 23. The fourth embodiment has the same effect as the third embodiment.

Figure 5:
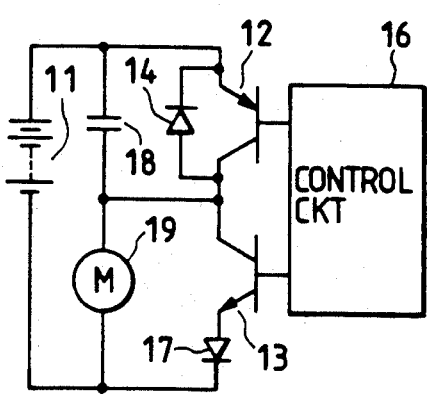

FIG. 5 shows a fifth embodiment of the invention. The fifth embodiment is different from the third embodiment in that the surge absorbing circuit, namely, the capacitor 18 is connected in parallel with first transistor 12. In the fifth embodiment, the surge voltage developed across wiper motor 19 is absorbed through capacitor 18 by vehicle battery 11. Thus, the fifth embodiment has the same effect as the third embodiment.

Figure 6:
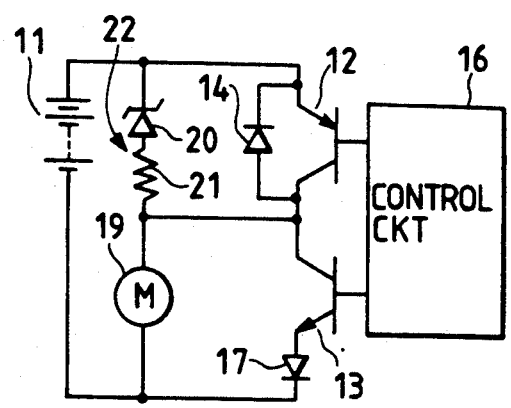
Figure 7:
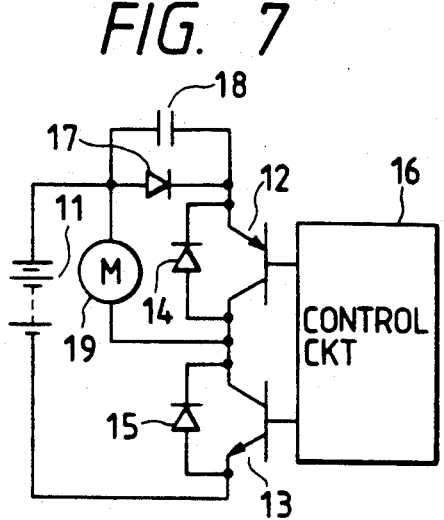
Figure 8:
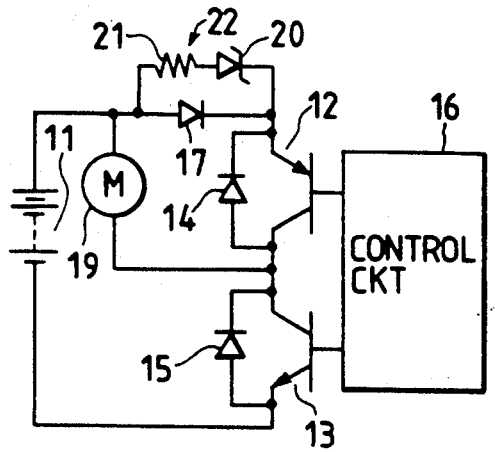
Figure 9:
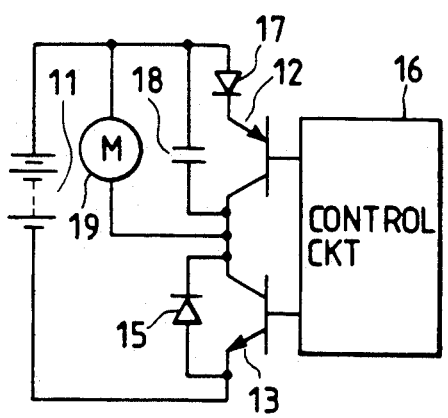
Figure 10:
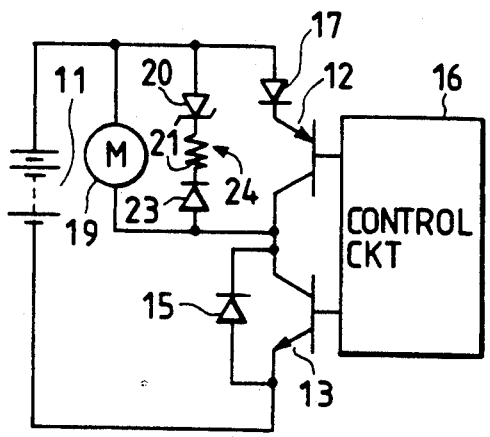
Figure 11:
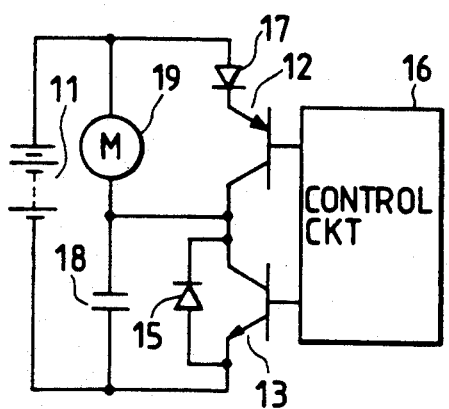
Figure 12:
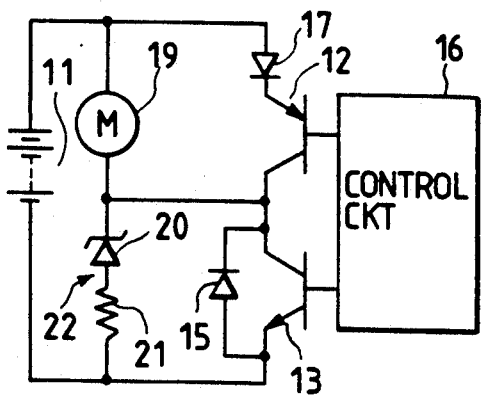
Figure 13:
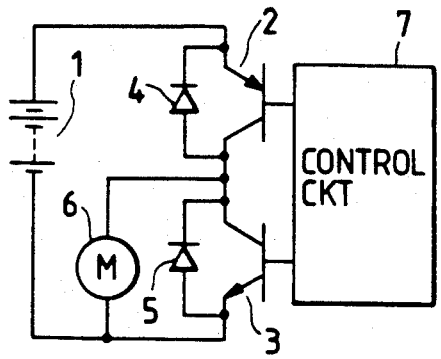
FIGS. 13 through 18 are circuit diagrams, partly as block diagrams, showing examples of a conventional motor drive circuit, respectively.
Figure 14:
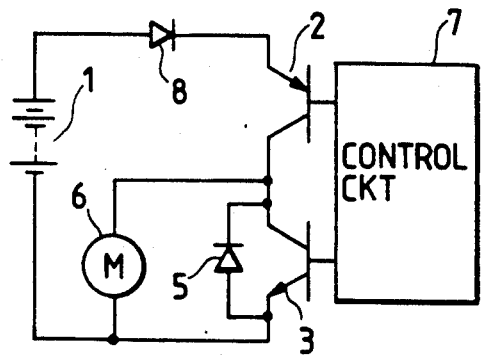
Figure 15:
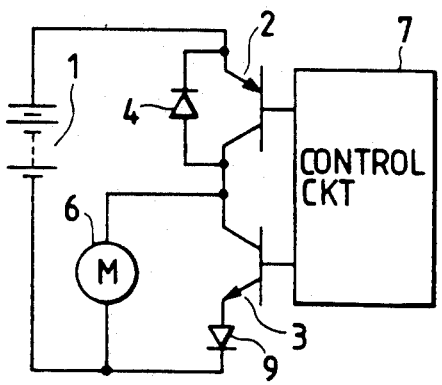

FIG. 6 shows a sixth embodiment of the present invention. The sixth embodiment is different from the second embodiment in that the surge absorbing circuit 22 is connected in parallel with first transistor 12. Thus, the effect of the sixth embodiment is substantially equal to that of the fifth embodiment.

Figure 16:
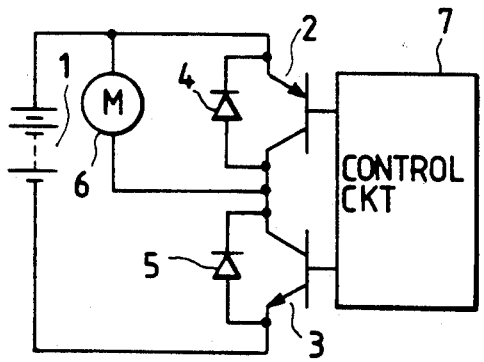
Figure 17:
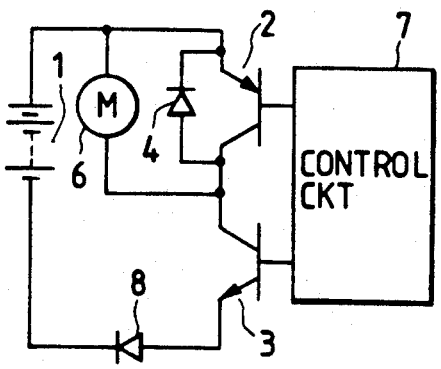
Figure 18:
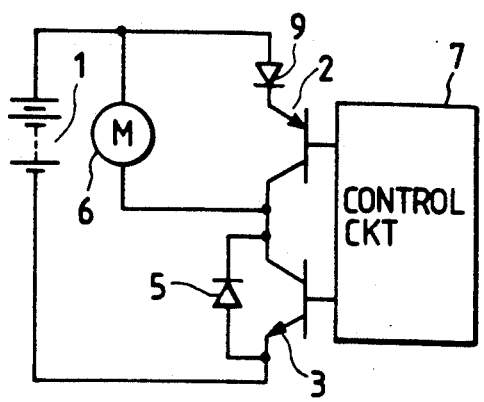

FIGS. 7 through 12 show seventh through twelfth embodiments of the invention, respectively. In these embodiments, wiper motors 19 are respectively connected in correspondence to the motor drive circuits shown in FIGS. 16 through 18. The seventh through twelfth embodiments correspond in arrangement to the first through sixth embodiments, respectively, thus having the same effects as the first through sixth embodiments.

In above-described embodiments, the surge absorbing circuits are made up of capacitors 18, and surge absorbing circuits 22 and 24 made up of Zener diode 20. However, it should be noted that the invention is not limited thereto or thereby. That is, instead of these surge absorbing circuits, a surge absorbing circuit made up of a circuit element such as a varistor or ZNR may be employed.

In the above-described embodiments, the technical concept of the invention is applied to a vehicle motor drive circuit. However, the invention is not limited thereto or thereby. That is, the technical concept of the invention can be applied to a wide ranges of motor drive circuits which are used to drive motor loads and stop the same by braking. That is, these embodiments of the present invention may be changed or modified in various manners without departing from the invention.

According to the present invention the reverse current blocking diode is connected in series to the second switching element, and the surge absorbing circuit is connected in parallel with the reverse current block diode. Hence, the motor drive circuit is protected from damage even when the DC source is connected in reverse polarity. Furthermore, in the motor drive circuit, the forward current is allowed to flow only when the second switching element is rendered conductive (on); i.e., only when the motor load is braked so as to be stopped, with the results that the generation of heat is suppressed, and the motor drive circuit can be manufactured at lower cost and can be miniaturized. When the motor load is locked, the first switching element is turned off, so that a surge voltage is developed across the motor load. In this case, the surge absorbing circuit and the second diode form the discharge path, thus absorbing the surge voltage, with the result that the first switching element is prevented from overvoltage breakdown. These effects should be highly appreciated.

Further, the motor drive circuits according to the present invention have reverse current blocking diodes, thus providing the same effects the motor drive circuit claimed herein. In each of the motor drive circuits, the surge absorbing circuit absorbs the surge voltage developed across the motor load, whereby the first switching element is prevented from overvoltage breakdown.

What is claimed is:

1. A motor drive circuit comprising:
   a motor;
   a DC source having first and second terminals connected to said motor;
   first switching element connected to said first DC source terminal and a common connecting point of said first switching element and a second switching element, wherein said first switching element controls current flowing to said motor by switching said current on and off;
   second switching element connected to said common connecting point and said second DC source terminal, wherein said second switching element turns on to brake said motor when said current is switched of by said first switching element;
   reverse current bypassing circuit, connected to at least one of said first switching element and said second switching element, for bypassing a reverse current supplied by said DC source;
   reverse current blocking circuit, connected in series between said second switching element and said second DC source terminal, for blocking said reverse current; and surge absorbing circuit for absorbing a surge voltage generated when said first switching element is turned off in response to a locking of said motor, said surge absorbing circuit being connected between said second switching element and said second DC source terminal in parallel with said reverse current blocking circuit.

2. The motor drive circuit as claimed in claim 1, wherein said reverse current bypassing circuit includes a diode connected in parallel with at least one of said first switching element and said second switching element.

3. The motor drive circuit as claimed in claim 1, wherein said reverse current bypassing circuit includes a first diode connected in parallel with said first switching element and a second diode connected in parallel with said second switching element.

4. The motor drive circuit as claimed in claim 1, wherein said surge absorbing circuit includes a capacitor.

5. The motor drive circuit as claimed in claim 1, wherein said surge absorbing circuit includes a series combination of a resistor and a Zenor diode.

6. The motor drive circuit comprising:
a motor;
a DC source having first and second terminals connected to said motor;
first switching element connected to said first DC source terminal and a common connecting point of said first switching element and a second switching element, wherein said first switching element controls current flowing to said motor by switching said current on and off;
second switching element connected to said common connecting point and said second DC source terminal, wherein said second switching element turns on to brake said motor when said current is switched off by said first switching element;
reverse current bypassing circuit, connected to at least one of said first switching element and said second switching element, for bypassing a reverse current supplied by said DC source;
reverse current blocking circuit, connected in series between said second switching element and said second DC source terminal, for blocking said reverse current; and
surge absorbing circuit for absorbing a surge voltage generated when said first switching element is turned off in response to a locking of said motor, said surge absorbing circuit being connected between said common connecting point and said second DC source terminal, such that said surge absorbing circuit is connected in parallel with the series combination of said second switching element and said reverse current blocking circuit.

7. The motor drive circuit as claimed in claim 6, wherein said reverse current bypassing circuit includes a diode connected in parallel with said first switching element.

8. The motor drive circuit as claimed inc claim 6, wherein said surge absorbing circuit includes a capacitor.

9. The motor drive circuit as claimed in claim 6, wherein said surge absorbing circuit includes a series combination of a resistor, a Zenor diode, and a diode.

10. A motor drive circuit comprising:
a motor having first and second terminals;
a DC source having first and second terminals, said second DC source terminal being connected to said second motor terminals;
first switching element connected to said first DC source terminal and a common connecting point of said first switching element and a second switching element, wherein said first motor terminal is connected to said common connecting point and said first switching element controls current flowing to said motor by switching said current on and off;
second switching element connected to said common connecting point and said second DC source terminal, wherein said second switching element turns on to brake said motor when said current is switched off by said first switching element;
reverse current bypassing circuit, connected to at least one of said first switching element and said second switching element, for bypassing a reverse current supplied by said DC source;
reverse current blocking circuit, connected in series between said second switching element and said second DC source terminal, for blocking said reverse current; and
surge absorbing circuit for absorbing a surge voltage generated when said first switching element is turned off in response to a locking of said motor, said surge absorbing circuit being connected between said first motor terminal connected to said common connecting point and said first DC source terminal connected to said first switching element, such that said surge absorbing circuit is connected in parallel with said first switching element.

11. The motor drive circuit as claimed in claim 10, wherein said reverse current bypassing circuit includes a diode connected in parallel with said first switching element.

12. The motor drive circuit as claimed in claim 10, wherein said surge absorbing circuit includes a capacitor.

13. The motor drive circuit as claimed in claim 10, wherein said surge absorbing circuit includes a series combination of a resistor and a Zenor diode.

* * * * *

UNITED STATES PATENT AND TRADEMARK OFFICE
CERTIFICATE OF CORRECTION

PATENT NO. : 5,142,433
DATED : August 25, 1992
INVENTOR(S) : Yasushi Nishibe et al.

It is certified that error appears in the above-identified patent and that said Letters Patent is hereby corrected as shown below:

Claim 1, column 6, line 60, change "of" to --off--.

Claim 8, column 8, line 5, change "inc" to --in--.

Signed and Sealed this

Thirtieth Day of November, 1993

Attest:

BRUCE LEHMAN

Attesting Officer          Commissioner of Patents and Trademarks